(12) United States Patent
Gabriel

(10) Patent No.: US 7,744,044 B2
(45) Date of Patent: Jun. 29, 2010

(54) LEAF CATCHER

(76) Inventor: Reno Michael Gabriel, 157- 16 27th Ave., Flushing, NY (US) 11354

( * ) Notice: Subject to any disclaimer, the term of this patent is extended or adjusted under 35 U.S.C. 154(b) by 68 days.

(21) Appl. No.: 12/125,889

(22) Filed: May 22, 2008

(65) Prior Publication Data

US 2009/0289154 A1    Nov. 26, 2009

(51) Int. Cl.
  *B65B 67/04*    (2006.01)
(52) U.S. Cl. .................... 248/101; 248/99; 248/907; 220/495.08
(58) Field of Classification Search .............. 248/95, 248/99, 101, 907, 903; 294/1.1; 141/391, 141/108; 220/495.06, 495.08, 908.3, 908.1; 206/554, 389, 390; 383/33–34.1
See application file for complete search history.

(56) References Cited

U.S. PATENT DOCUMENTS

| 3,687,030 | A |  | 10/1972 | Schultz |  |
|---|---|---|---|---|---|
| 3,744,081 | A |  | 7/1973 | Miller |  |
| 3,754,785 | A |  | 8/1973 | Anderson |  |
| 3,998,415 | A |  | 12/1976 | D'Antonio et al. |  |
| 4,615,743 | A |  | 10/1986 | Bylenga |  |
| 4,664,348 | A | * | 5/1987 | Corsaut et al. | ................ 248/99 |
| 5,050,920 | A |  | 9/1991 | Potticary |  |
| 5,106,041 | A |  | 4/1992 | Jelincic |  |
| 5,308,027 | A |  | 5/1994 | Fullilove |  |
| 5,645,186 | A | * | 7/1997 | Powers et al. | .......... 220/495.11 |
| 5,655,739 | A | * | 8/1997 | Teh-Wah Goo | ............. 248/101 |
| 5,671,861 | A | * | 9/1997 | Hall et al. | .............. 220/495.08 |
| 6,003,820 | A |  | 12/1999 | Baldonado et al. |  |
| 7,131,552 | B2 | * | 11/2006 | Simonson | .............. 220/495.06 |
| 7,281,690 | B2 | * | 10/2007 | Kelley | .......................... 248/97 |
| 7,284,732 | B1 | * | 10/2007 | Lopa | ............................ 248/99 |
| 2002/0100844 | A1 | * | 8/2002 | Green | ............................ 248/99 |
| 2004/0195467 | A1 | * | 10/2004 | Passage | ........................ 248/99 |
| 2006/0243867 | A1 | * | 11/2006 | Strickland et al. | ........... 248/101 |

* cited by examiner

*Primary Examiner*—A. Joseph Wujciak, III

(57) ABSTRACT

A device that assists with the collection of leaves or debris by holding a garbage bag completely open so a user does not need to awkwardly bend down and hold open a bag while raking leaves into it. Thus, the user has both hands free to hold and use a rake or broom to sweep leaves or debris into the open bag. The bag is affixed to a frame with spring biased clips mounted in top and bottom structure of a bag receptive frame, the clips being received in cavities in the top and bottom structure so that the clips in a closed position thereof are flush with top and bottom structure surfaces adjacent thereto providing uniform surface for each of the top and bottom structure.

2 Claims, 3 Drawing Sheets

LEAF CATCHER

BACKGROUND OF THE INVENTION

The invention relates to a device for receiving a leaf collection bag and holding it with a bag entry end or mouth maintained open so that user readily can pass leaves into the bag. Representative of such type of device are described, inter alia, in U.S. Pat. Nos. 3,697,030; 3,754,785; 3,744,081; 3,998,415; 4,615,743; 5,050,920; 5,106,041; 5,308,027 and 6,003,820.

The device is a hands free device that will hold a bag wide open so a user can rake leaves or other debris into the bag without holding the bag. The current means and methods employed to rake leaves into a bag are difficult and straining because it requires a person to bend over and at the same time use one hand to open a bag and the other hand to hold a rake and then rake leaves into the bag. This invention eliminates bending while filling a bag and also helps lift the bag when it is full.

BRIEF SUMMARY OF THE INVENTION

The device of the invention is a free standing one that holds a bag wide open and allows a user to stand upright while raking leaves or sweeping debris into a garbage bag. The bag is easily and securely attached to the device using four clips which are located at each of the four corners of the device perimeter. The invention provides a solution that eliminates the need for a user to bend over while raking leaves or sweeping debris into a bag. This invention also provides a solution to holding a bag wide open so that a user does not have to use his/her hands. In addition, the invention has a handle that helps the user move the device from one pile of leaves or debris to another and also enables the user to easily lift a full bag of leaves into an upright position without requiring the user to bend over. These major features were developed in order to reduce or eliminate the strain on a users back, arms, and legs which is typically experienced while raking or sweeping leaves or debris into a bag.

A bottom front portion of each clip 2 is provided with serrated teeth 40 which function to enhance the grip with which the collection bag is held in the device.

Taper surface 9 is the front base area of the leaf catcher that is tapered so that small debris can be captured. This is similar to the front edge of a standard dust pan. However because the thickness of the base is relatively shallow, the need for a tapered edge may not be necessary.

Figure 1:
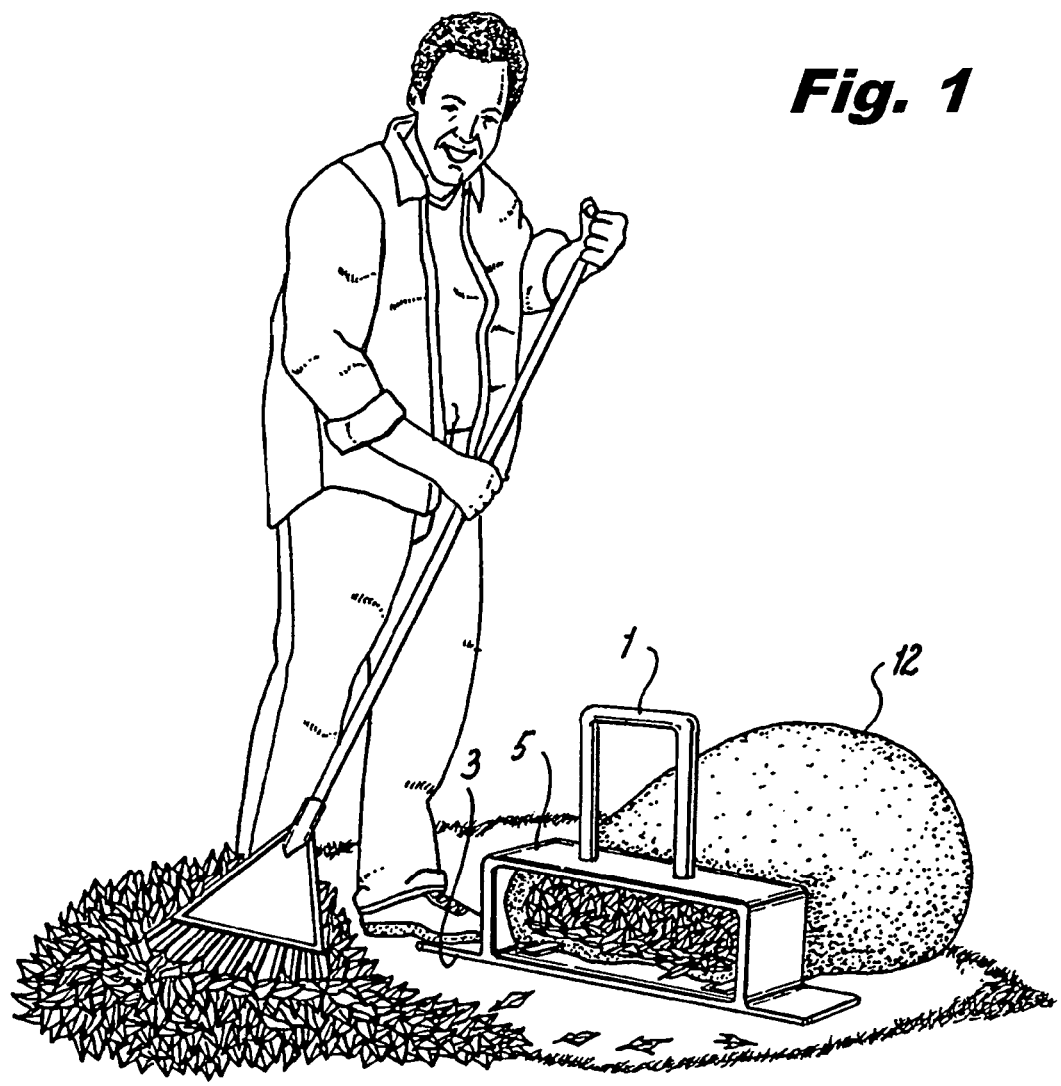
FIG. 1 depicts a user using the Leaf Catcher device. It shows the user standing upright and stepping on the device to keep it in place while filling the bag.
Figure 4A:
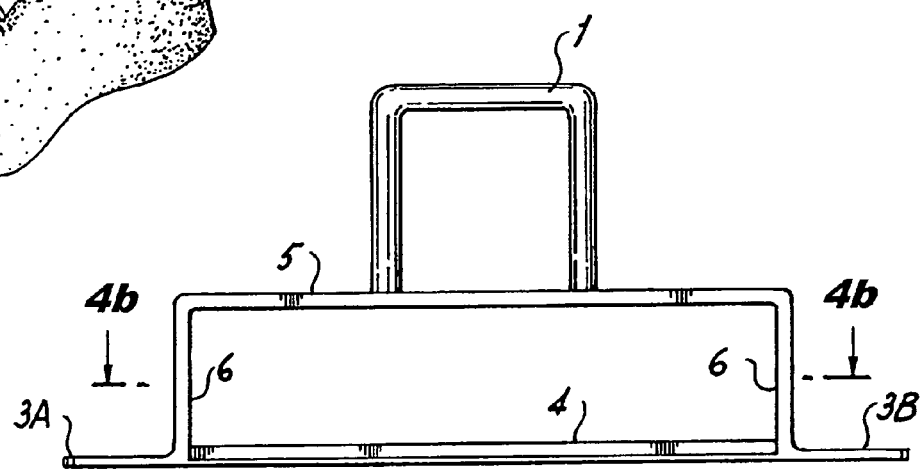
FIG. 4a is a top elevation view of the leaf catcher and showing the foot rests 3.
Figure 4B:
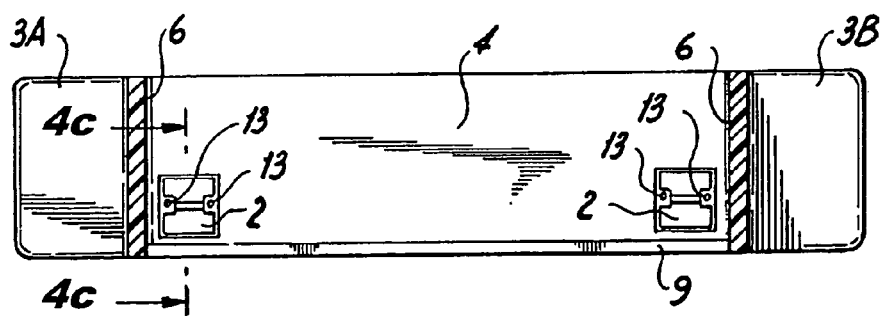
FIG. 4b is a section view taken on the line 4b-4b in FIG. 4a to show the clips 2 that are attached to the device and foot rests 3 via screws 13 and spring 11, the spring being best seen in FIG. 4c.
Figure 4C:
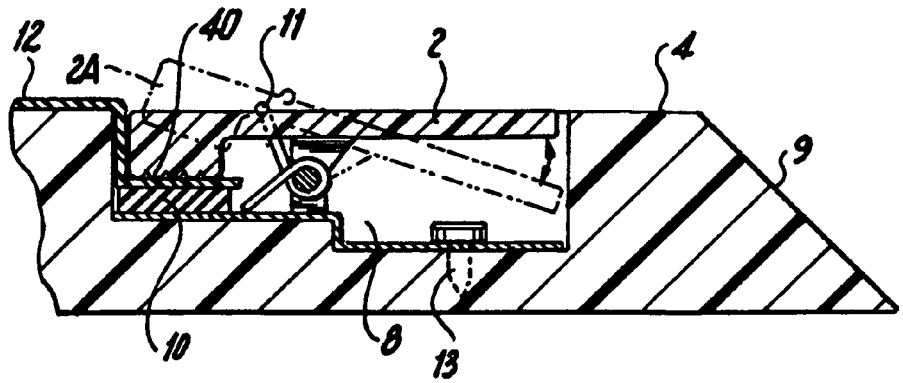
FIG. 4c is a fragmentary section view taken on the line 4c-4c in FIG. 4b to indicate the clip cavity areas 8 to show the relation between a bag 12, and the clip 2. The clip 2 is also shown in an open position 2A as a "phantom" view. 8 is the back portion of the cavity in the base which will house the clips. This "cavity" area is recessed so the clip will fit flush with the top surface of the base 4 and top wall 5 of FIG. 2. A semi rigid foam type material 10 is received in cavity areas 8 and will slightly compress so that when the clip is engaged the bag will be wedged into a secure position between the clip and the foam so that the bag remains in place. The foam 10 may also be substituted with another suitable material or no material depending on manufacturing costs.
Figure 5:
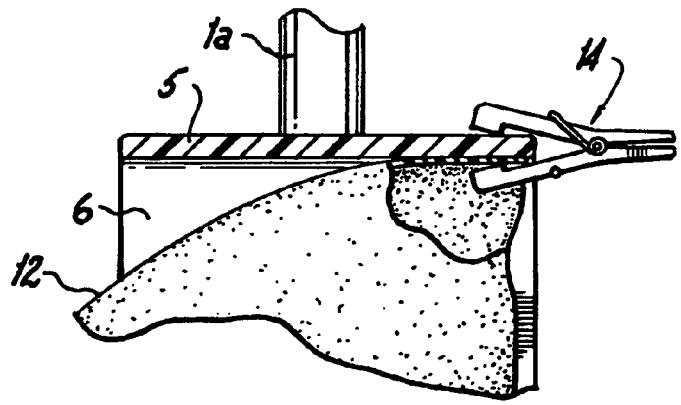
Figure 5A:
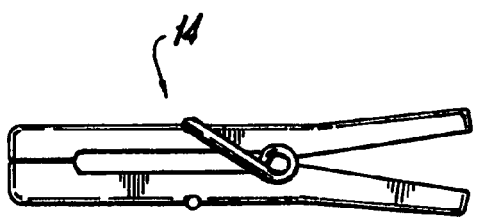
Figure 5B:
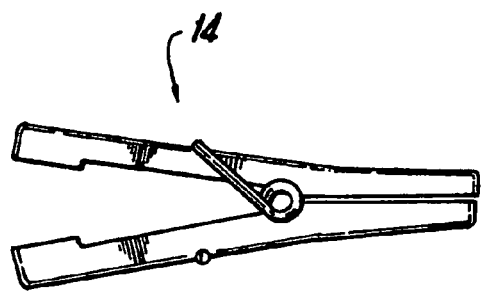

FIG. 5 is a fragmentary side section view depicting a different embodiment of the leaf catcher device from FIG. 1 with optional clips used to secure a bag to the leaf catcher. In the event the manufacturing costs are cost prohibitive, the standard binder clips shown in. FIGS. 5a and 5b, a total of four, one at each corner may be used in place of the clips 2 shown in FIGS. 2 and 4.

DETAILED DESCRIPTION OF THE INVENTION

Figure 2:
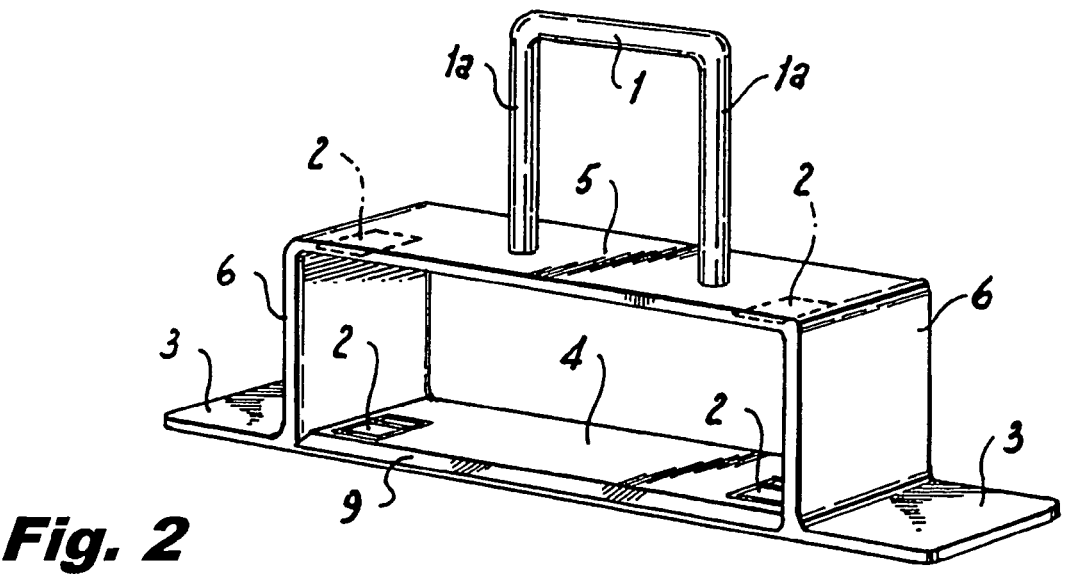
FIG. 2 is a perspective showing of the Leaf Catcher as a free standing device with all features pointed out as noted and further described in the detailed description. 1 is the handle, 2 are the spring biased clips, 3a, 3b are the foot rests, 4 is the base, 5 is the top wall, 6 are the side walls connecting opposite ends of the base and top wall.

The leaf catcher shown in FIGS. 1 and 2 can be easily lifted by the handle 1, 1A and a bag can be attached, using the 4 clips 2 located at the corners of the perimeter as shown on the drawings. A clip can be easily pressed down so that it is in the open position (FIG. 4c, item 2A) and then the user can slide a bag under the open clip and then release the clip which will close down on the bag to secure the bag in place. This is repeated 3 more times and the bag is securely attached to the device. After the bag is attached with the four clips, it is held wide open and the user places the device on the floor and steps on either one of the two provided "foot rests" 3 to hold the device in place. Two foot rests were provided to accommodate left or right handed people. This allows the user to use both hands to hold a rake or broom to push or sweep leaves or debris into the open bag. The "foot rest" feature also ensures that the leaf catcher remains is one position without moving while raking or sweeping. Once leaves/debris are in the bag, the user pulls the handle up and over at a 90 degree angle until the leaf catcher and bag are in an upright position (see FIG. 3). Now the leaf catcher is on top of the opened bag and permits the user to continue to fill the bag while it is being held open by the leaf catcher. When the bag is filled the user simply presses on each of the 4 clips to release the bag from the leaf catcher. Now, with the filled bag in an upright position, it can be tied together with minimal bending by the user.

The leaf catcher is intended to be made of plastic, or other suitable material of sufficient durability to withstand years of wear and tear. Plastic was selected because it can be extruded or formed in the shape as shown in the drawings. The entire frame, handle, foot rests, and cavity for the four clips are envisioned to be one cohesive device made from a mold and extruded, including the handle to give it rigidity, and durability. The clips will be made of two materials, plastic and a metal "spring like" mechanism that will be either affixed to the perimeter into the clip cavity FIG. 4a item 8 of the device with screws 13 or may be sold separately (See FIGS. 5a and 5b item 14) depending on manufacturing costs. The intent of this design is to manufacture a cavity into the plastic to "house" the clips. The clip attachment will likely require a separate step in the manufacturing process. However, if this step is cost prohibitive an option would be to sell the clips as an accessory that fit on the box as shown in cross section in FIG. 5. Clips can be supplied with the product. The clips (FIGS. 5a and 5b) used in the prototype were standard binder clips sold at a local convenience store and they worked fine.

The dimensions of the leaf catcher opening were selected based on a standard 33 gallon black garbage bag. Various sizes and types of bags (including plastic and paper) can also be used by simply squeezing the bag edges together until it fits within the perimeter of the device frame. (As a separate manufacturing process, and alteration to the design, it is also possible to make the rectangular opening smaller or larger so that various sizes of bags may be accommodated.) The overall thickness of all the walls of the device can be approximately ½ inch overall with ⅛" plastic wall thickness and made of PVC, however a manufacturer will best determine the actual dimensions to ensure a durable, quality product, which can be fabricated at a reasonable cost. Also based on a market and cost analysis, these details (thicknesses) will be better defined. For now, sizes detailed below are approximate based on the prototype and best available information.

The base 4 of the device is approximately 4"-6" deep, 33" overall width (including foot rests) and ½" thick in height. 6 are the walls of the box approximately 4"-6" deep, and 1½ ft high and ½" overall thickness with ⅛" wall thickness. 5 Is the top wall of the box also 4"-6" deep, ½" thick with ⅛" wall thickness, and 22" in width. These measurements were selected to accommodate a standard lawn and leaf bag and also provide an ideal size opening of the bag. The opening dimensions were also selected to optimize the opening area so that a standard size rake's width matches the opening to capture as much leaves and debris as possible.

Figure 3:
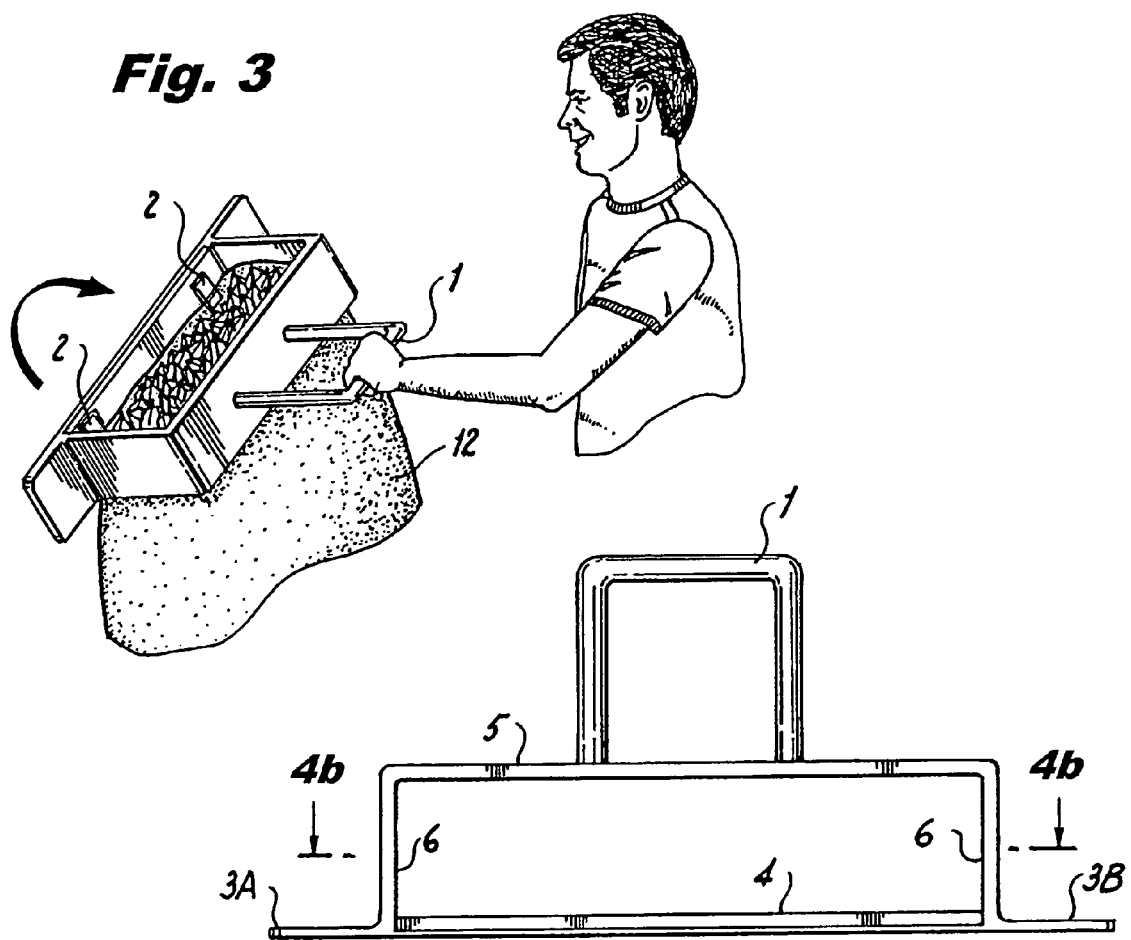
FIG. 3 depicts the Leaf Catcher device in an upright position after using the specially designed handle that eliminates bending, the bag being filled with leaves.

Attached to the top of the leaf catcher is a unique handle 1, 1A of a sufficient height to minimize bending while lifting the leaf catcher and contents of the bag. The handle is a rectangular shape which provides a connection, which is intended to be integral during the manufacturing process, at two points on the top wall 5 of the leaf catcher as shown in FIG. 3. Connecting the handle at two points provides the leverage needed to easily lift a full bag of leaves or debris. This type of connection will help ensure that the handle will remain attached to the device providing durability and longevity.

There are four clips 2 strategically placed at the corners of the "opening" portion of the device as shown in FIG. 2. The clips are intended to have a dual feature of allowing the user to easily open the clip (to insert the bag) and when released, tightly secure the bag to the leaf catcher. The clips are specially designed to be flush with the base of the leaf catcher so that as debris is raked or swept over the clip they are not damaged while leaves and debris pass over the top. This concept is also applied to the two clips in the top wall.

Also important to the success of this product is the storage, distribution, and shelf space requirements. To optimize these requirements or effectively reduce them, the leaf catcher may be manufactured so that it is tapered on all sides so that leaf catchers can be "stacked" inside one another (like stacking paper cups into one another) to minimize shelf, transportation, warehouse, d storage space limitations. Another option would be to have a "slot" cut out of the base of the leaf catcher so that a handle from another leaf catcher can fit into the slot. This will reduce the space requirements by at least 30%. Another option would make the leaf catcher "collapsible" so it can and can fold similar to a folding chair. Another option would be to replace each of the two side walls 6 with lightweight metal posts at each corner that can fit into the top and bottom walls of the device and can be assembled by the user to reduce the overall storage, distribution, and shelf space height by over 50%.

The base 4 of the leaf catcher can have a tapered base 9 similar to a dust pan so that smaller debris may be easily swept into the box.

I claim:

1. A catcher device for holding an end of a flexible bag open while filling the bag with leaves and like debris, said catcher device comprising:
    a frame having a base, a top, and side walls extending between said base and said top, said base having foot rest lengths extending beyond said side walls, said base further having a tapered front end surface facilitating leaf and debris entry to said bag, said frame top carrying a frame handle; and
    spring biased clips carried in cavity spaces in said base and in said top at corners of said frame and normally acting in a clip closed position to engage said bag for securing an open end of said bag in bag open condition on said frame, a top portion of each of said clips in clip closed position disposing flush with frame base and top surfaces adjacent therewith thereby maintaining a uniform surface for each of said frame base and said top, said clips being moveable counter to said spring bias to a clip open position for bag placement on and release from said frame.

2. A catcher device in accordance with claim 1, further comprising a semi rigid compressible foam material disposed in each cavity space of said base and said top against which an associated clip front portion in contact with said bag in clip closed position acts to compress said foam material to create a tight seal securement of said bag to said frame.

\* \* \* \* \*